United States Patent [19]

Thiel et al.

[11] Patent Number: 5,111,914
[45] Date of Patent: May 12, 1992

[54] SPOT-TYPE DISC BRAKE

[75] Inventors: Rudolf Thiel, Frankfurt am Main; Ulrich Klimt, Muehltal; Georg Halasy-Wimmer, Eschborn, all of Fed. Rep. of Germany

[73] Assignee: Alfred Teves GmbH, Frankfurt Am Main, Fed. Rep. of Germany

[21] Appl. No.: 294,333

[22] Filed: Jan. 6, 1989

[30] Foreign Application Priority Data

Jan. 7, 1988 [DE] Fed. Rep. of Germany ....... 3800157

[51] Int. Cl.⁵ ............................................. F16D 65/09
[52] U.S. Cl. ........................... 188/73.34; 188/73.1; 188/73.35; 188/73.38; 188/73.39; 188/73.45
[58] Field of Search ............... 188/73.34, 73.39, 73.45, 188/73.35, 73.36, 73.37, 73.38, 250 B, 73.1

[56] References Cited

U.S. PATENT DOCUMENTS

| | | | |
|---|---|---|---|
| 3,972,393 | 8/1976 | Gourbert et al. | 188/73.1 X |
| 4,056,174 | 11/1977 | Wienand et al. | 188/73.36 |
| 4,219,106 | 8/1980 | Lupertz et al. | 188/73.39 |
| 4,289,217 | 9/1981 | Heibel | 188/73.38 |
| 4,316,530 | 2/1982 | Gehlen et al. | 188/73.39 |
| 4,319,670 | 3/1982 | Oka et al. | 188/73.34 |
| 4,335,806 | 6/1982 | Lupertz | 188/73.38 X |
| 4,372,428 | 2/1983 | Delaunay et al. | 188/23.45 X |
| 4,445,595 | 5/1984 | Baum | 188/73.38 |
| 4,446,947 | 5/1984 | Deit | 188/73.34 |
| 4,487,296 | 12/1984 | Schreiner et al. | 188/73.39 X |
| 4,498,564 | 2/1985 | Tamura | 188/73.39 X |

FOREIGN PATENT DOCUMENTS

| | | | |
|---|---|---|---|
| 2804808 | 8/1979 | Fed. Rep. of Germany . | |
| 2577639 | 8/1986 | France | 188/250 B |
| 141957 | 11/1979 | Japan | 188/73.35 |
| 2147673 | 5/1985 | United Kingdom | 188/73.36 |

Primary Examiner—George A. E. Halvosa
Attorney, Agent, or Firm—Robert P. Seitter; J. Gordon Lewis

[57] ABSTRACT

A spot-type disc brake for automotive vehicles, with a housing and with a brake carrier provided with two arms which are positioned in radial direction relative to the brake disc at a distance from each other and with a brake lining slidably guided at the arms in the direction of brake application and furnished with a carrier plate. The brake lining is connected to the arms in a positive locking fit in the direction of the circumference of the brake disc in such a manner that the frictional force occurring at the brake lining is transmitted to both arms at least in the presence of more elevated brake application forces. The arms with surfaces facing each other form a guide which is open in radially outward direction and serves to accommodate and guide the brake shoe. One arm in the vicinity of the brake disc is formed with a groove extending in the direction of brake application and is open outwardly. The housing is arranged axially slidably on pins by of pin guides and the housing bridge is supported through the carrier plate. The contour of the brake lining is positioned outside a swinging range of the housing and is swingable about one of the pins.

31 Claims, 6 Drawing Sheets

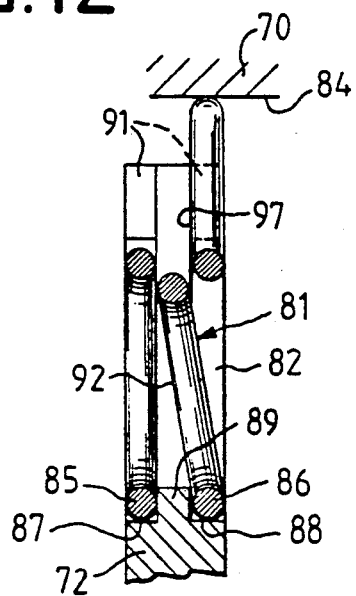
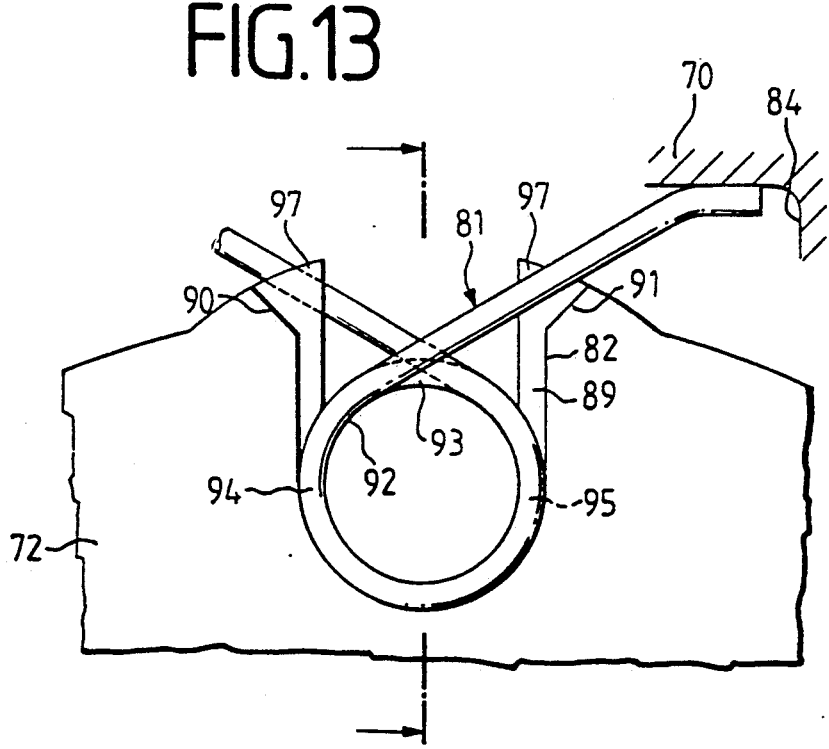

SPOT-TYPE DISC BRAKE

BACKGROUND OF THE INVENTION

The invention relates to a spot-type disc brake for automotive vehicles and having a housing with a brake carrier having a pair of arms positioned in radial direction relative to the brake disc.

Such a brake is known from published German patent application No. 28 04 808. This disclosed brake is a floating caliper spot-type disc brake for automotive vehicles with a brake carrier fastened to the steering knuckle of an automotive vehicle, being unslidable relative to a brake disc and at which brake shoes positioned on either side of the brake disc and a brake caliper straddling the edge of the brake disc and the brake shoes from the outside in a U-shaped manner are axially slidably guided and retained. In the direction of a secant of the brake disc, the brake carrier is furnished with carrier elements located at a distance from one another and straddling the edge of the brake disc and is formed with grooves on both sides of the brake disc in which the ends of the brake shoes which are arranged in the direction of a secant are guided and supported. The brake caliper is axially slidably connected to the brake carrier by means of a pin guide positioned on the side of the brake carrier facing away from the brake disc. Disadvantageously, both pins must be unscrewed out of the brake carrier and a housing retaining spring must be detached before the brake linings can be changed.

A disc brake of the pin slide-type is disclosed in German patent published application No. 30 09 524, in which one slide pin is detachable and the caliper is swingable upon unscrewing the slide pin. The brake linings of this type do take support at the holder. However, a hammer head brake lining by which the frictional force occurring at the brake lining is transmitted to both arms, even in the presence of more elevated brake application forces, disadvantageously is not provided. This is problem.

SUMMARY OF THE INVENTION

It is an object of the present invention to provide a simple and effective guide which provides support of the housing and easy servicing with respect to the change of the linings in a spot-type disc brake of the type described.

This object is achieved according to the present invention in that the contour of the brake lining is located outside a swinging range of the housing and in that the housing is swingable about one of the pins of the pin guide. In this manner, the brake lining allows changing by unscrewing one pin from the brake carrier, by removing it from the spot-type disc brake and by swinging the caliper about the other pin.

According to the advantageous embodiment of the present invention, the housing is furnished with laterally projecting housing arms with bores in which the pins are positioned. The distance between the pins is increased, because of the lateral arrangement of the housing arms. In essence, the housing arms determine the end points of a swinging radius so that the swinging radius becomes large when the distance of the housing arms is increased and, thus, the contours of the brake housing of the brake carrier and of the brake shoes do not obstruct one another.

According to one embodiment of the present invention, the pin about which the swinging motion is performed is solidly pressed into the brake carrier. This renders superfluous operations such as cutting of the thread for the pin about which the swinging motion takes place. At the same time, the pin advantageously is protected against external influences by a metal protection cap with which the housing is furnished.

In a particularly advantageous simple-design embodiment of the present invention, two metal bushings are arranged in the bore of the housing arm between the pins and the arm. In this manner, the pin guide for the pin about which the swinging motion is to be performed consists of two metal bushings which readily can be manufactured at low cost. In a further embodiment of the present invention, the pins are identical. Only one pin type employed so that manufacture and inventory are facilitated. In another advantageous embodiment, a sealing cap is positioned at an upper end of the pin and a further sealing sleeve is positioned between the housing arm and the brake carrier arm which protect the pin against external influences in the range of its upper end and in a range located between the housing arm and the brake carrier arm. According to a further embodiment of the present invention, the carrier plate of a brake lining is provided with knobs on its side opposite the lining side which serve to support the housing bridge above the brake lining at the brake carrier arms. According to a another preferred embodiment of the invention, the carrier plate of a brake lining is formed with a trapezoidal configuration wherein a semicircular projection is provided which engages a groove of the housing bridge. In this way, the housing bridge is supported at the brake carrier arm through the carrier plate.

In further embodiment of the present invention, the piston-side brake lining is secured by a spiral spring and a spiral section of the spring is inserted in a groove of a piston. Due to the spiral section of the spring engaging the groove of the piston, a firm seating of the spring in the piston is achieved which provides a simple mounting operation. According to another preferred embodiment of the present invention, a spring is inserted in a recess of the carrier plate and with upper ends engages a recess of the housing bridge. Advantageously, the carrier plate of a brake lining is provided with lateral abutment surfaces which serve to provide lateral support and a firm guide to the spring. The spring is secured against twisting because it is supported in its upper ranges.

BRIEF DESCRIPTION OF THE DRAWING

Following is a detailed description of the invention with reference to embodiments illustrated in the accompanying drawing wherein:

FIGS. 12 and 13 show a detail of a carrier plate with spring.

DETAILED DESCRIPTION OF A PREFERRED EMBODIMENT

Figure 1:
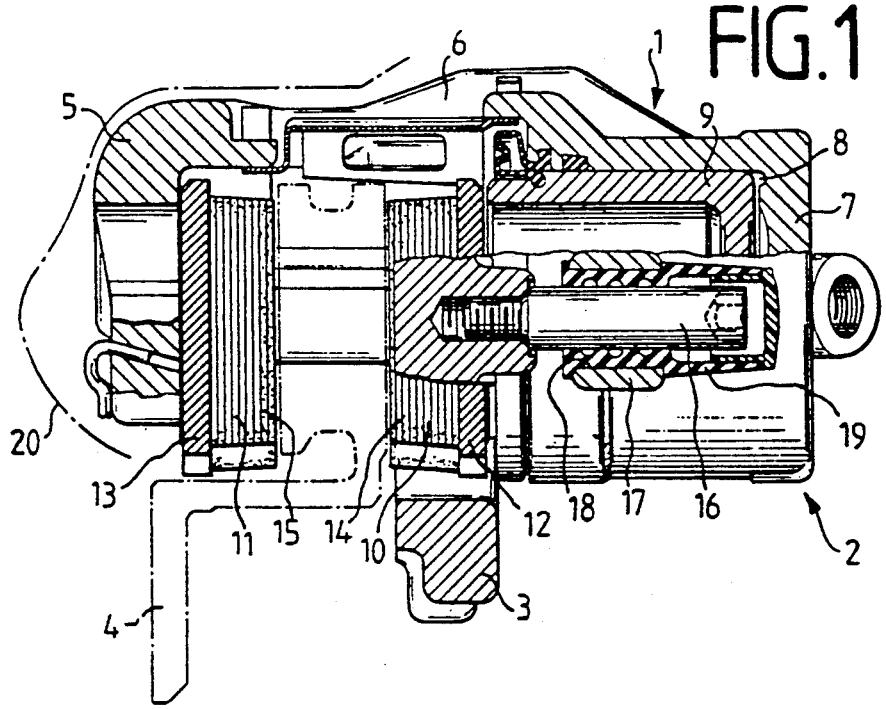
FIG. 1 shows a sectional lateral view of a spot-type disc brake in accordance with the present invention.

FIG. 1 illustrates a fist caliper spot-type disc brake 1 with a caliper housing 2 and a brake carrier 3. The housing 2 straddles a brake disc 4 in a U-shaped manner with a stem 5, a bridge 6 and a section 7. In section 7 an actuating unit 8, 9 comprising a cylinder 8 and a piston 9 is arranged. Actuating unit 8, 9 presses a brake lining 10 directly and a brake lining 11 indirectly through the housing bridge 5 and 6 against the brake disc 4 upon operation of the brake. The brake linings 10, 11 present carrier plates 12, 13 and friction linings 14, 15. The housing 2 is slidably supported on two pins 16. (Only one of the pins 16 being shown in the figure.) The pin 16 is screwed into the holder 3. The housing 2 is provided with a housing arm 17 furnished with a bore 18. An elastic spring element 19, or damping sleeve, bushing or pin guide, is positioned coaxially on the pin 16, in the bore 18 and projecting on both sides of the bore. The spot-type disc brake 1 is located in a wheel with a wheel contour 20.

Figure 2:
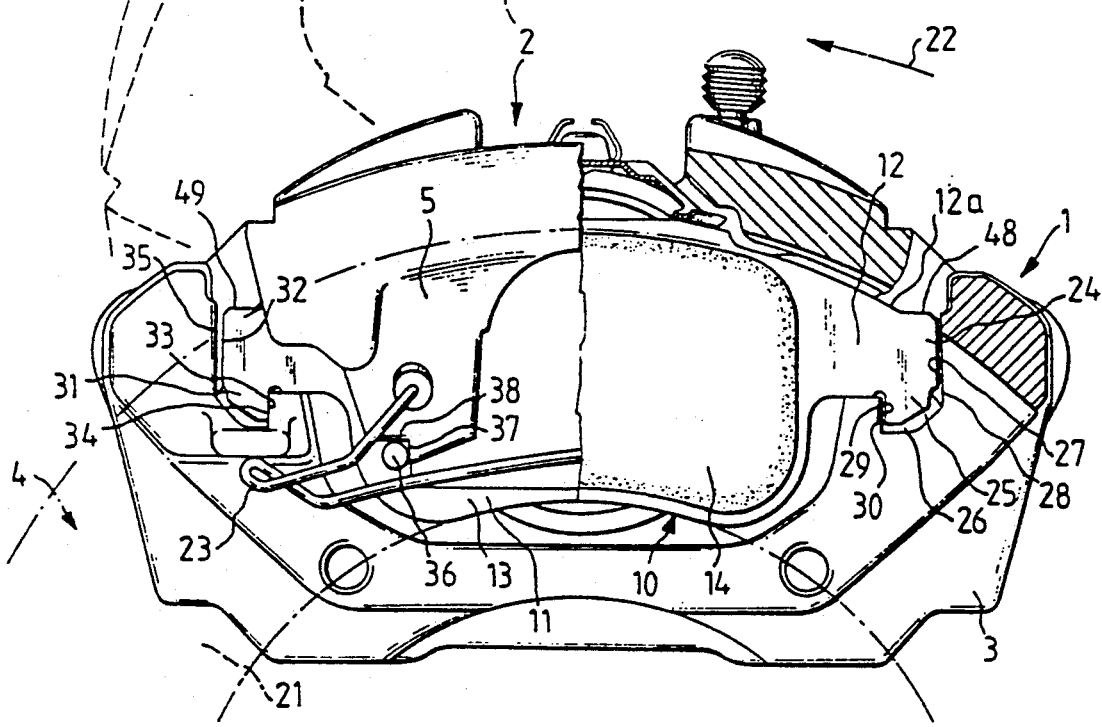
FIG. 2 shows a partial sectional front view of the spot-type disc brake.

FIG. 2 shows a spot-type disc brake 1 with the housing 2 capable of being swung open on hinges and the brake carrier 3. The brake disc 4 with a friction surface 21 rotates in the sense 22 during forward driving. The housing 2 and the brake carrier 3 are braced against each other by a spring 23. The carrier plate 12 of the brake lining 10 presents a hook-shaped range 24 with a radially inwardly directed projection 25 which extends into a groove 26 of the brake carrier 3 positioned near the brake disc 4. In the event of brake operation during forward driving, the brake lining 10 takes support with its surface 29 at a surface 30 of the brake carrier 3. In the event of brake operation during backward driving, the brake lining 10 takes support with a surface 27 of the brake carrier plate 12 at a surface 28 in the groove 26. The range 31 of the carrier plate 12 presents surfaces 32, 33 which come to be abutted against the surfaces 34, 35 of the brake carrier 3 during operation of the brake. The carrier plate 13 of the brake lining 11 is furnished with two pins 36, which are also called knobs, projections or knubs, only one of the pins 36 being shown in the sectional illustration which serve to support the housing 2 through the carrier plate 13 at the brake carrier 3 during operation of the brake. The housing 2 presents surfaces 37, 38 which abutt against the pin 36 in a rectangular shape. The pins 36 are positioned vertically, centrally and symmetrically on the side of the carrier plate positioned opposite the lining side. Edges 48, 49 corresponding to the hook-shaped ranges 24, 31 and located opposite the projections 25 are approximately in alignment with an edge 12a of the carrier plate. In this manner, the edges 12a, 48, 49 which form an outer upper contour of the carrier plate 12 of the brake lining 10 are positioned outside the swinging range of the housing bridge 6 of the housing 2. The upper contour 12a, 48, 49 of the linings 10, 11 is thus configurated such that the housing 2 is swingable about one of the pins 16. The outer upper contour 12a, 48, 49 of the carrier plate 12 is thus determined. Therefore, the housing is supported centrally at the external carrier plate 13.

Figure 3:
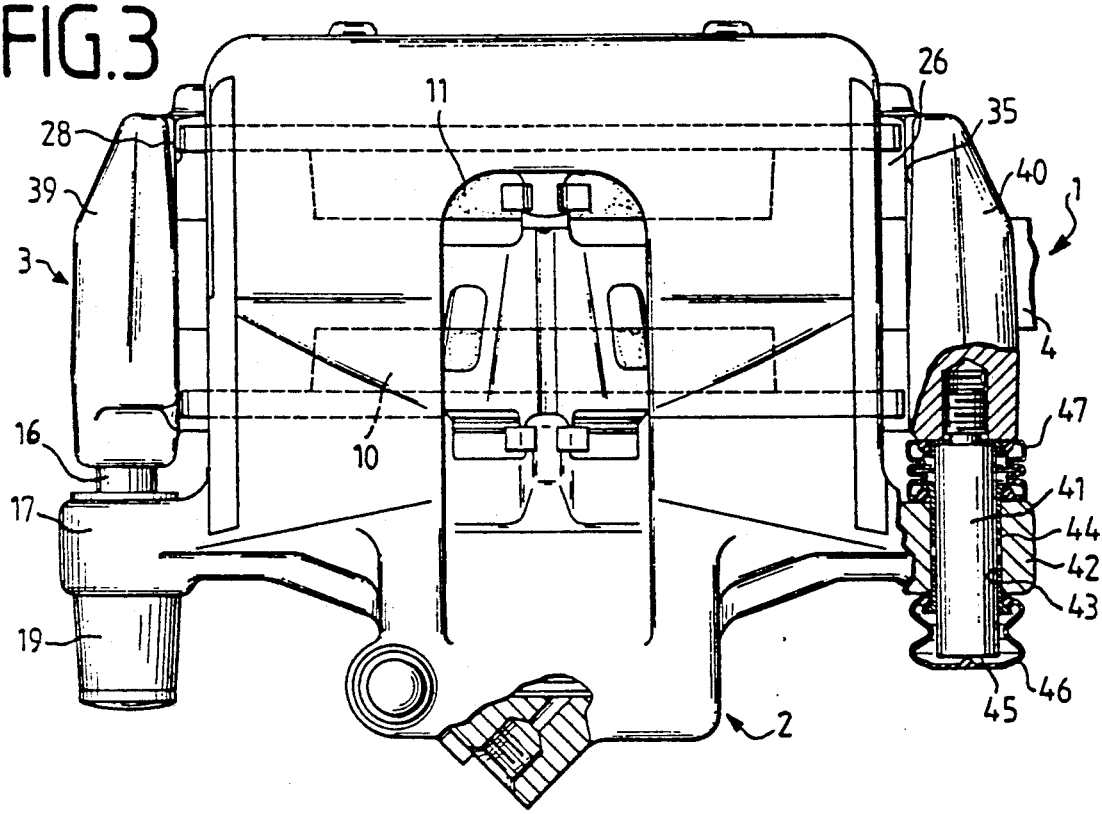
FIG. 3 shows a partial sectional top view of the spot-type disc brake.

FIG. 3 shows the spot-type disc brake 1 with the brake carrier 3 which is provided with two supporting arms 39, 40 extending in axial direction across the brake disc 4. With the surfaces 28, 35 facing each other; the arms 39, 40 form a guide being open radially toward the outside and serving to accommodate and guide the brake linings 10, 11 and they present the grooves 26 which are open radially toward the outside and extend in the vicinity of the brake disc in the direction of brake application. The brake linings 10, 11 are slidably guided at the arms 39, 40 and are connected to the arms in a positive locking fit in the circumferential direction of the brake disc in such a manner that the circumferential forces occuring at the brake shoes are transmitted to both arms at least in the presence of more significant brake application forces. A pin 41 is screwed into the arm 40 which is identical to the pin 16. The housing 2 is furnished with the housing arm 17 and a further housing arm 42 with a bore 43. The bores 18 and 43 (also called eyes) are identical in size. In the bore 43 and between the pin 41 and the arm 42, two metal bushings (also called pin guides) are accommodated which slide on the pin 41, together with the housing on brake operation. An elastic sealing cap 46 is positioned at the upper end 45 of the pin 41 which protects the guide against dirt and moisture and sealingly surrounds the pin 41. Between the arm 42 of the housing 2 and the brake carrier arm 40 of the brake carrier 3, a rubber-like sealing sleeve 47 is arranged which surrounds the pin 41 between the brake carrier 3 and the housing 2 as a protective means. The pin 16 is screwed out of the brake carrier 3 in order to open the hinged housing 2. Thereupon and on detaching the spring 23, the housing 2 is swung about the pin 41. The pins 16 and 41 are arranged in the housing arms 17 and 42 and in the supporting arms 39, 40, both of which project laterally from the housing; that is, in positions shifted to the outside to an extent that the housing 2 and the brake carrier 3 do not obstruct each other in the event of the swinging motion.

Figure 4:
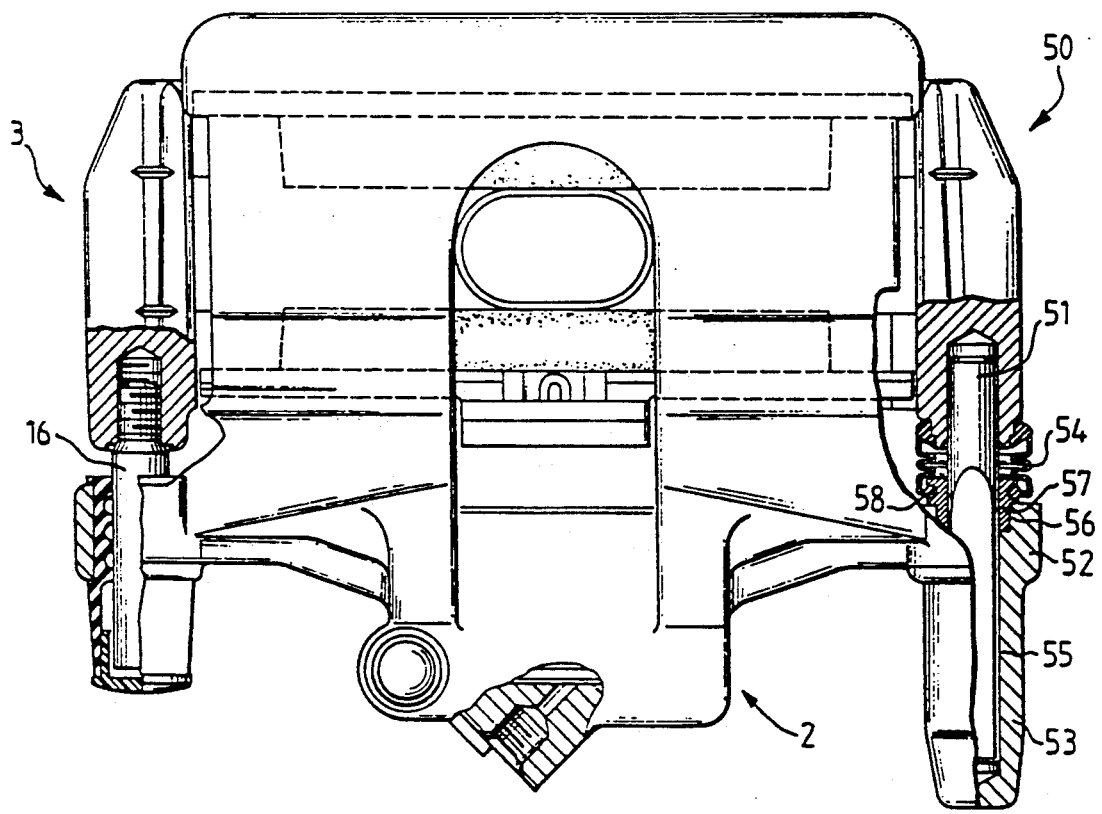
FIG. 4 shows a partial sectional top view of another spot-type disc brake in accordance with the present invention.

FIG. 4 shows a spot-type disc brake 50 with a guide pin 51 solidly pressed into the holder 3. At its arm 52 the housing 2 is furnished with a long guide in the shape of a metal protection cap 53 in which the pin 51 is positioned. A rubber-like protection sleeve 54 is located between the arm 52 and the brake carrier 3. Arm 52 of the housing 2 presents two bores 55 and 56, whose center lines are identical. The bore 56 is located in the range of the arm 52 and is shorter than the bore 55. The diameter of the bore 56 is larger than that of the bore 55. Bore 56 serves to accommodate a plastic or metal bushing 57 which surrounds the pin 51 and retains a bead 58 of the protection sleeve 54 (also called boot) in abutment at the arm 52. Otherwise, the spot-type disc brake 50 is structured in a similar manner as the spot-type disc brake 1.

Figure 5:
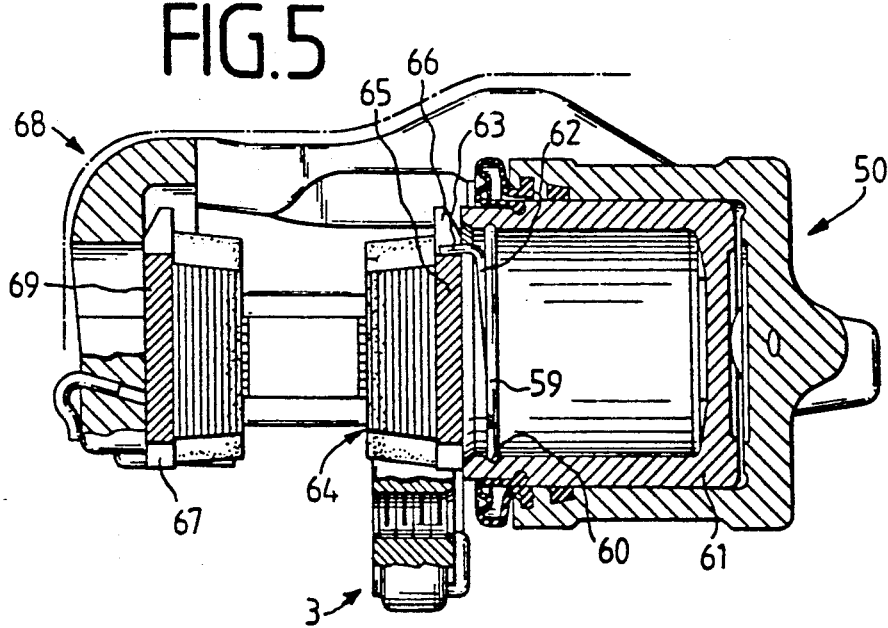
FIG. 5 shows a sectional lateral view of the spot-type disc brake.

FIG. 5 shows the spot-type disc brake 50 with a piston spring 59. Spring 59 is circular and is inserted in a groove 60 of a piston 61. One stem 62 of the spring 59 projects from the piston and clamps with its end 63 a directly actuated brake lining 64 forcing it against the brake carrier 3, respectively, pressing with its end 63 the piston-side brake lining 64 against the brake carrier 3.

Brake lining 64 is provided with a carrier plate 65 having two trapezoidal projections 66. Projections 66 of the external brake shoe 67 serve to support the housing 68 through the carrier plate 69 of the brake lining 67 at the brake carrier 3 on operation of the brake. The housing bridge presents two trapezoidal grooves (also called recesses) which are engaged by the projections 66. The projections 66 substitute the pins 36.

Figure 6:
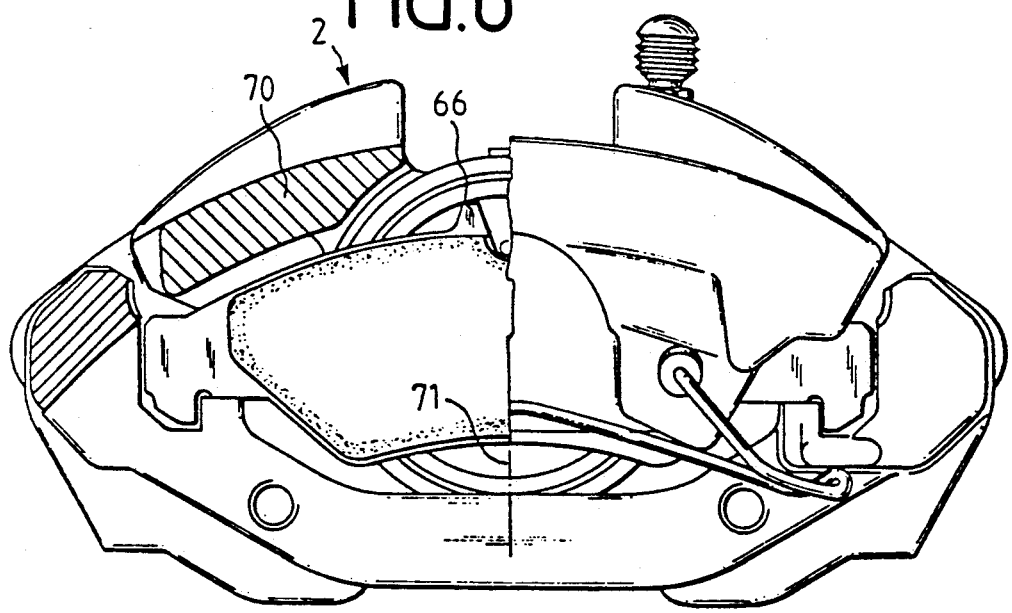
FIG. 6 shows a partial sectional front view of the spot-type disc brake.

FIG. 6 shows one of the projections 66. Projections 66 are arranged centrally in the range of a housing bridge 70 of the housing 2. The second projection 66 is arranged symmetrically and specularly with respect to the sectional axis 71 and are not visible in this figure.

Figure 7:
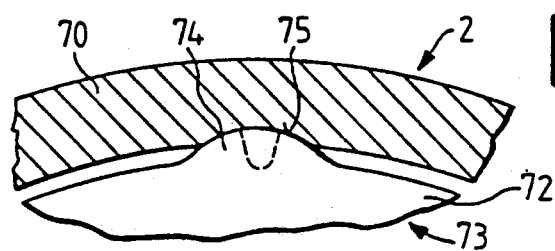
FIG. 7 shows a detail of a mounting of a carrier plate within a caliper housing.

FIG. 7 shows a third method of supporting the housing 2 through a carrier plate 72 of a brake lining 73 at the brake carrier 3. In this configuration, the carrier plate 72 is formed with a semicircular projection 74 (also called crescent-shaped projection) which engages an annular groove 75 (also called recess) of the housing 2. This projection 74 also is arranged centrally in the range of the housing bridge 70.

Figure 8:
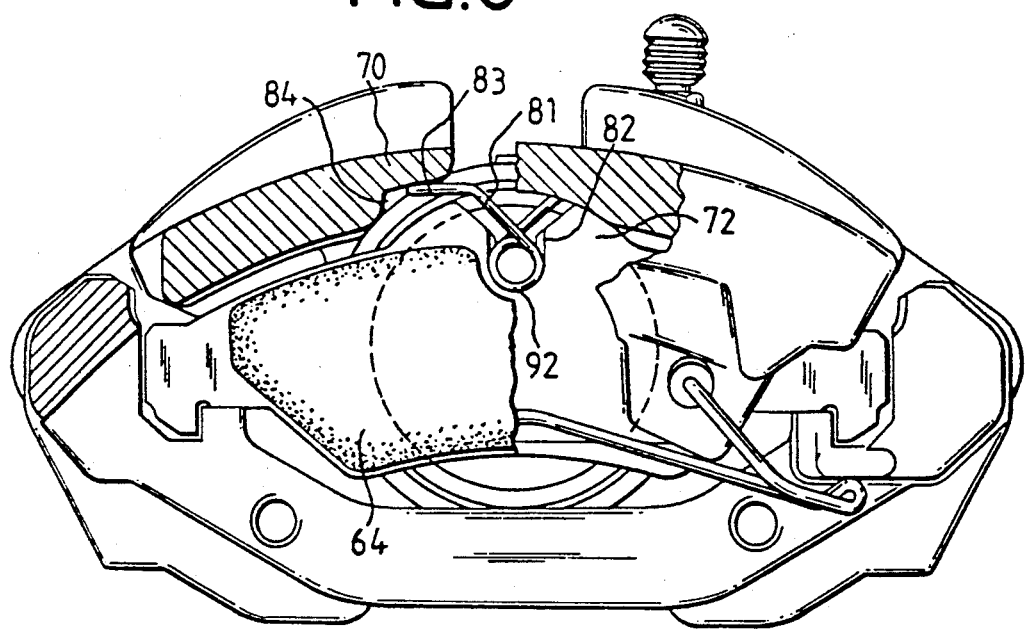
FIG. 8 shows a partial sectional front view of a spot-type disc brake with a lining retaining spring.

FIG. 8 shows a further technique for clamping the brake lining 64 forcing it against the brake carrier by means of a spring 81. Spring 81 is inserted with a spiral section 92 in a recess 82 at the lining carrier 72 and with its upper ends 83 engages a recess 84, thereby clamping the lining.

Figure 9:
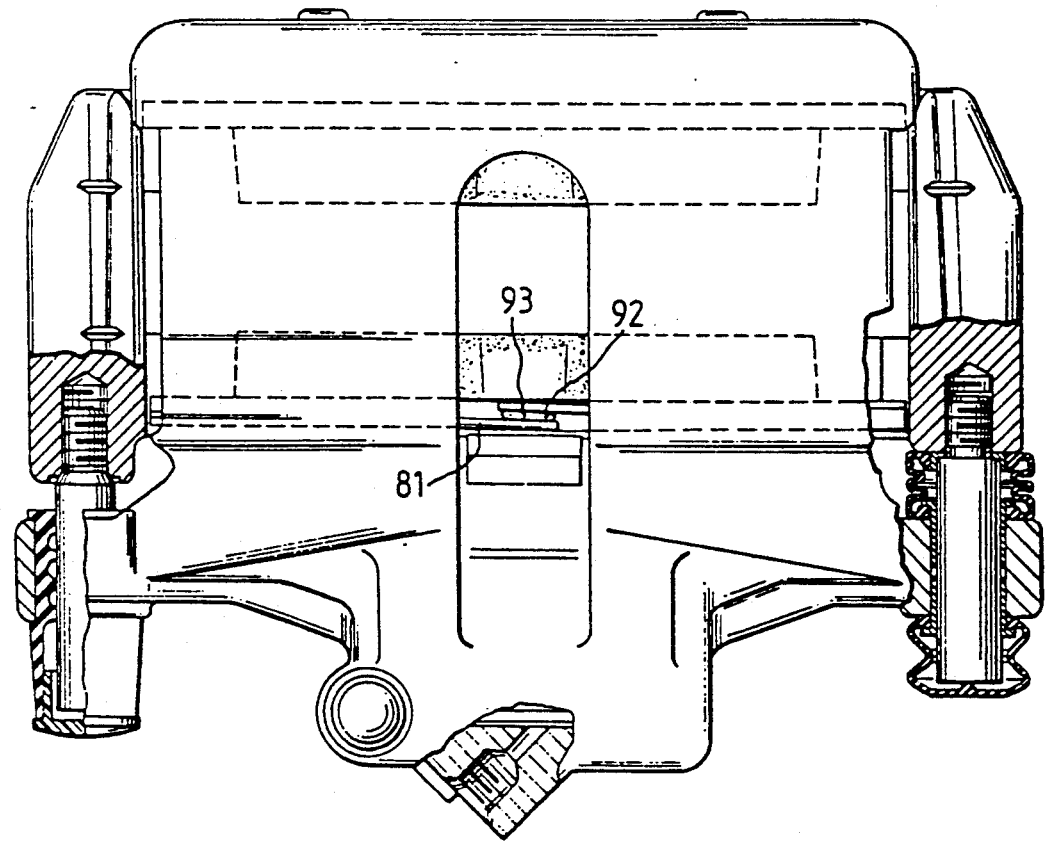
FIG. 9 shows a partial sectional top view of that same spot-type disc brake.

FIG. 9 shows a top view of a spot-type disc brake with the spring 81. The spiral section 92 presents two circular segments and between these, a connecting web 93.

Figure 10:
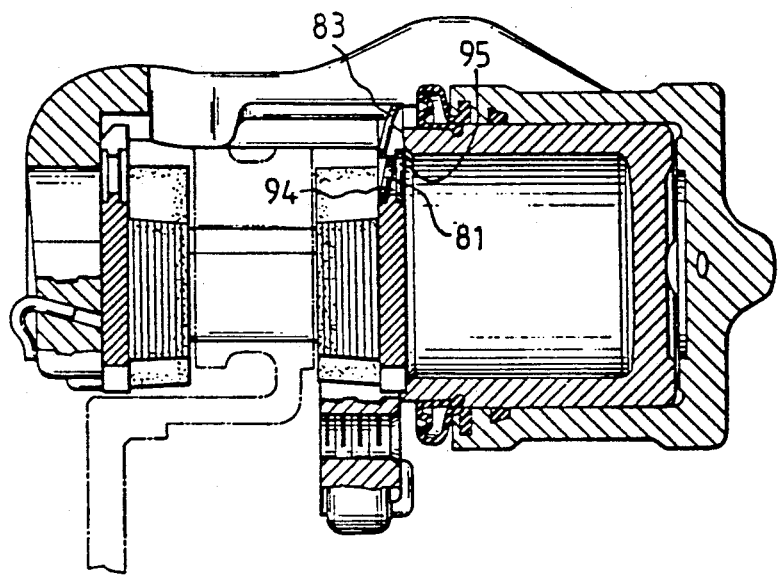
FIG. 10 shows a sectional lateral view of the spot-type disc brake.

FIG. 10 shows a lateral view of the spot-type disc brake with the spring 81. The two circular segments 94, 95 are connected to each other by the connecting web 93, and at the opposite ends, the circular segments are succeeded by the spring ends 83.

Figure 11:
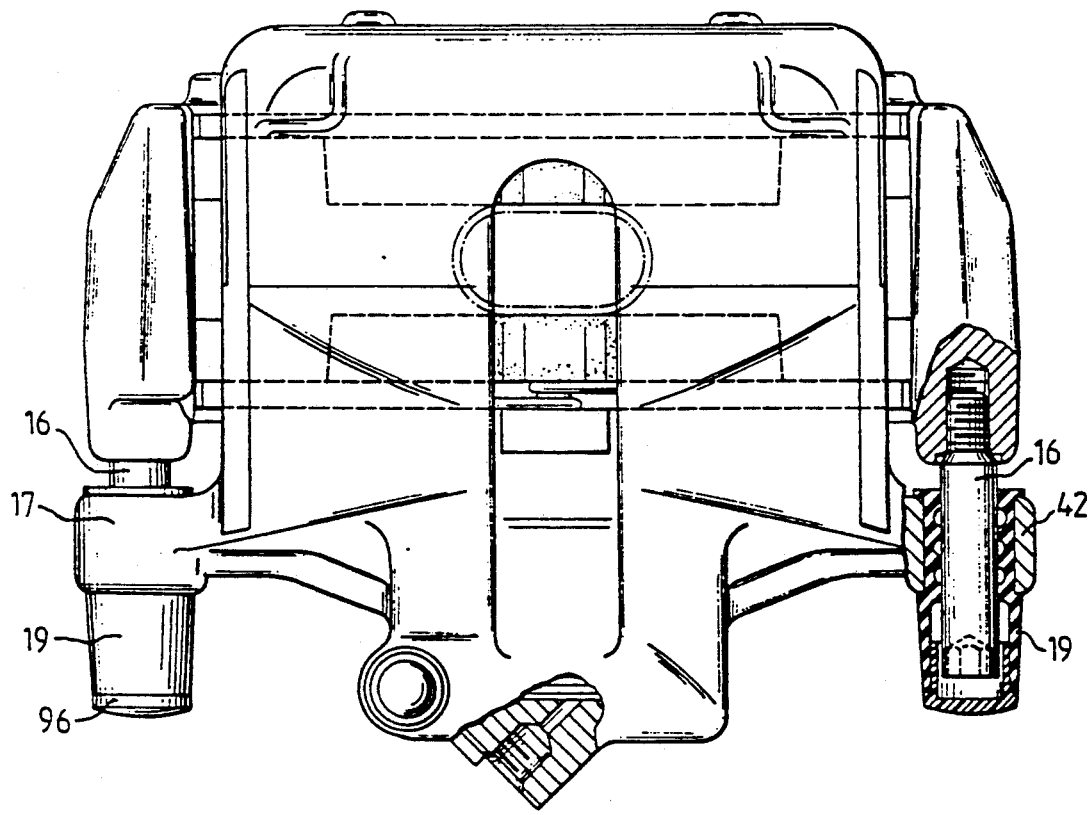
FIG. 11 shows a spot-type disc brake with two identical bushings.

FIG. 11 shows a spot-type disc brake with two identical pins 16 which are screwed into the supporting arms 39, 40. Both pins 16 are supported in identical damping sleeves 19 in the bores 18, 43 of the housing arms 17, 42. Damping sleeves are closed by a cap 96.

FIGS. 12 and 13 show the design of a carrier plate 72 to accommodate a spring 81 which takes support at the housing bridge 6, 70 in a recess 84. The lower sections 85, 86 are integral parts of the circular segments 94, 95 of the spring 81 which are supported on surfaces 87, 88 of the carrier plate 72 and positioned beside a U-shaped projection 89. Advantageously, the carrier plate 72 is formed, at the projection 89, with a conical widening 90, 91 presenting abutment surfaces 92 to give additional support to the spring 81. Abutment surfaces 92 are parallel to the braking area of the brake lining.

The second pin 16 is supported in the rubber sleeve 19 which provides balancing tolerances and forms a second guide axis. The lateral machining of the housing which is customary for prior art spot-type disc brakes can be avoided in the caliper design of the present invention and the following advantages are achieved:

A. Easy motion caliper guide, which is not being subject to corrosion.

B. Reduction of cost, because of the machining operations which can be eliminated.

C. Increased stiffness of the caliper, since the housing bridge allows to be significantly widened (functional advantage).

D. Increased lining area and therefore longer service life.

E. Anti-lift function, that is, lifting of the housing 2 on operation of the brake of the caliper, safeguarded by the long guide pin 51.

F. Because of its special design, the spring 59 engaging the piston groove 60 presses on the internal lining carrier 65 with the end 63 of that spring which projects from the piston. There is no relative motion between the spring 59 and the housing 2 which is otherwise present. Corrosion, residual torques and oblique wear therefore are avoided or reduced.

G. For the purpose of a change of the linings, only the pin 16 screwed into the holder 3 needs to be unscrewed, and the housing 2 can be opened up, due to the axis of rotation of the pressed-in pin 44, 51 being shifted utterly toward the outside. The caliper is preserved as a unit (servicing advantage) and the supporting bearing 53, 55 (which is greased for life) is not opened afterward. Moreover, the spring 59 mounted in the piston 61 maintains its position during a change of the lining, but does not impair the swinging operation and on swinging closed of the caliper housing, as it automatically clamps the piston-side lining 64 to prevent rattling, though preserving ease of motion.

H. Due to the centered, point-shaped abutment of the housing 2 against the external lining carrier 69, easy motion of the housing guide is ensured, even under the effect of circumferential force. At the same time, the abutment forms the point of support for the action of the housing retaining spring 23, and a machining operation for the housing support/lining carrier may be eliminated.

I. The carrier plates 12, 13, 69, 73 are employed on either side of the unit.

J. Advantageously, a low cost wire spring 81 may be employed.

What is claimed is:

1. A spot-type disc brake, for automotive vehicles, comprising, in combination: a housing furnished with a housing bridge and a brake carrier provided with two parallel arms which are positioned at a distance from each other and with a brake lining slidably guided at the arms in the direction of brake application and furnished with a carrier plate, said brake lining being connected to said arms in a positive locking fit in the direction of the circumferential so that the frictional force occurring at the brake lining is transmitted on both of said arms at least at elevated brake application forces, said arms with surfaces facing each other forming a guide which is open in outward direction and serves to accommodate and guide a brake shoe, at least one of said arms being formed with a groove extending in the direction of brake application and being open outwardly, the housing being arranged axially slidably on pins by means of pin guides and said housing bridge being supported through the carrier plate, wherein a projection of said carrier plate projects into a recessed opening of said housing bridge to centrally support said housing through said carrier plate onto said brake carrier and which constrains circumferential rotation of said carrier plate relative to said housing, and wherein the contour of the brake lining is located outside a swinging range of said housing.

2. The spot-type disc brake as claimed in claim 1, wherein said housing is furnished with laterally projecting housing arms with bores in which said pins are positioned.

3. The spot-type disc brake as claimed in claim 2, wherein said housing is furnished with a metal protection cap in which the said one pin is positioned.

4. The spot-type disc brake as claimed in claim 2, wherein a metal bushing is arranged in said bore between said one pin and said arm of said housing.

5. The spot-type disc brake as claimed in claim 2, wherein said one pin is solidly pressed into the brake carrier.

6. The spot-type disc brake as claimed in claim 5, wherein the said housing is swingable about the said pressed-in pin, wherein the said pin is longer than a screwed-in pin and wherein a metal protection cap represents a long guide for the said pressed-in pin.

7. The spot-type disc brake as claimed in claim 6, wherein said carrier plate is furnished with hook-shaped ranges on opposite sides being formed with projections which engage grooves of the brake carrier arms.

8. The spot-type disc brake as claimed in claim 7, wherein edges corresponding to the said hook-shaped ranges and located opposite said projections are in alignment with an edge of said carrier plate.

9. The spot-type disc brake as claimed in claim 1, wherein said pins are identical.

10. The spot-type disc brake as claimed in claim 9, wherein said one pin is screwed into the said brake carrier.

11. The spot-type disc brake as claimed in claim 1, wherein a sealing cap is positioned at an upper end of said one pin.

12. The spot-type disc brake as claimed in claim 11, wherein a sealing sleeve is arranged between the said housing arm and the said brake carrier arm.

13. The spot-type disc brake as claimed in claim 1, wherein the said carrier plate is provided with knobs on its side opposite the lining side.

14. The spot-type disc brake as claimed in claim 13, wherein the said carrier plate is formed with a semicircular projection.

15. The spot-type disc brake as claimed in claim 13, wherein said carrier plate is formed with a trapezoidal projection.

16. The spot-type disc brake as claimed in claim 15, wherein the said housing is furnished with a concentric guide for its support on the brake lining.

17. The spot-type disc brake as claimed in claim 15, wherein the said housing bridge of the said housing is provided with a groove which is engaged by the said projection.

18. The spot-type disc brake as claimed in claim 1, wherein the actuated brake lining is secured by a spiral piston spring and wherein a spiral section of said spring is inserted in a groove of a piston.

19. The spot-type disc brake as claimed in claim 1, wherein a spring is inserted in a recess of the said carrier plate and with upper ends engages a recess of the said housing bridge.

20. The spot-type disc brake as claimed in claim 19, wherein the said carrier plate is provided with abutment surfaces to give lateral support to the said spring.

21. The brake lining for a spot-type disc brake as claimed in claim 1, wherein the said carrier plate is provided with knobs.

22. The brake lining for a spot-type disc brake as claimed in claim 1, wherein the said carrier plate is formed with a trapezoidal projection.

23. The brake lining for a spot-type disc brake as claimed in claim 1, wherein the said carrier plate is formed with a semicircular projection.

24. The brake lining for a spot-type disc brake as claimed in claim 1, wherein said carrier plate is furnished with hook-shaped ranges on opposite sides bgeing formed with projections which engage grooves of said brake carrier arms.

25. The brake lining for a spot-type disc brake as claimed in claim 24, wherein edges corresponding to the said hook-shaped ranges and located opposite said projections are in alignment with an edge of said carrier plate.

26. A spot-type disc brake for automotive vehicles, comprising, in combination: a housing having a housing bridge and comprising a brake carrier having two arms arranged in parallel and spaced from each other and comprising a brake pad which is slidably guided on the arms in the direction of brake application and including a carrier plate, said brake pad being positively connected with the arms in the direction of the circumferential forces, said arms with facing surfaces forming an outwardly open aperture to accommodate and guide the brake shoe, with the housing being axially displaceably arranged on pins by means of pin guides and, with a surface arranged on the bottom side of the housing bridge, being radially supported on the brake carrier by way of the carrier plate of the external brake pad, wherein a projection (74) of the carrier plate (72) lying in the axis of symmetry (71) of the brake (1) projects into the housing (2) and centrically supports the housing (2) and precludes circumferential rotation of said carrier plate (72) relative to the housing (2).

27. A spot-type disc brake as claimed in claim 26, wherein a projection (74) is of circle-sector shaped design and engages into a circle-sector-shaped groove (75) of the housing bridge (6) whose radius is more than the radius of the projection (74).

28. A spot-type disc brake as claimed in claim 27, wherein at least one groove-shaped recess subdivides a projection into at least two trapezoidal extensions.

29. A spot-type disc brake as claimed in claim 28 wherein a groove (75) of the housing bridge (6) is machined.

30. The spot-type disc brake comprising a friction lining and a carrier plate as claimed in claim 29, wherein on its upper side extending in circumferential direction, the carrier plate (72) is provided with a circle-sector-shaped projection (74) arranged in the axis of symmetry (71) of the brake pad (73).

31. The spot-type disc brake as claimed in claim 30, wherein at least one recess is engaged by the projection and subdivides the projection into at least two trapezoidal extensions.

* * * * *